Figure 1:
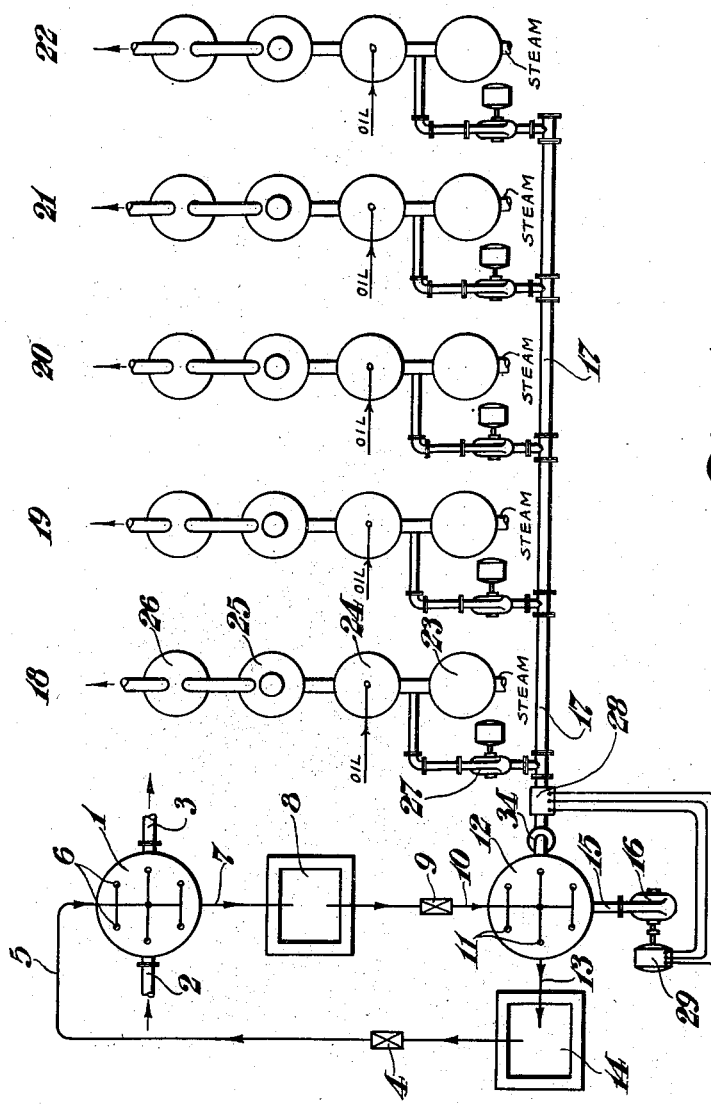

Aug. 4, 1931.  F. W. SPERR, JR  1,817,777
GAS MANUFACTURING PROCESS AND APPARATUS
Filed Aug. 5, 1926  3 Sheets-Sheet 1

INVENTOR
Frederick W. Sperr Jr.
BY
Jesse R. Langley
ATTORNEY

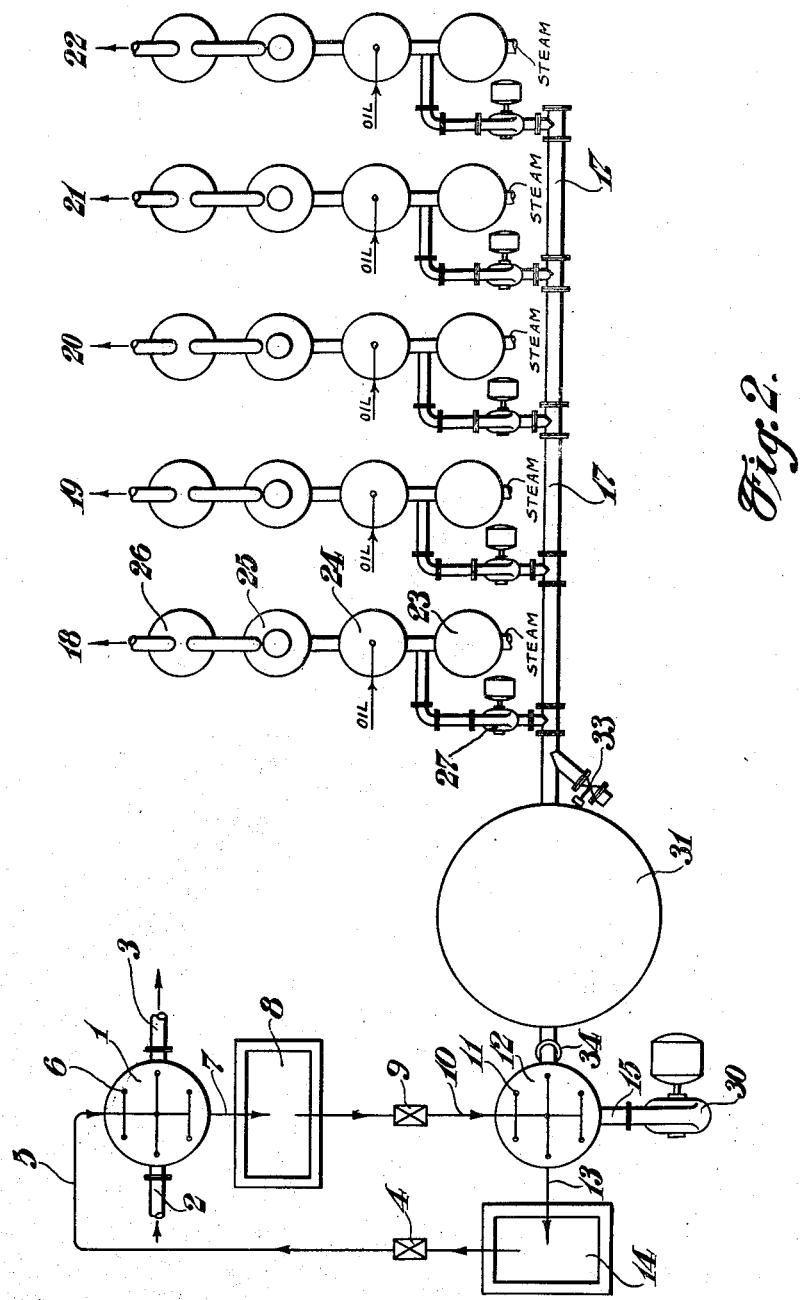

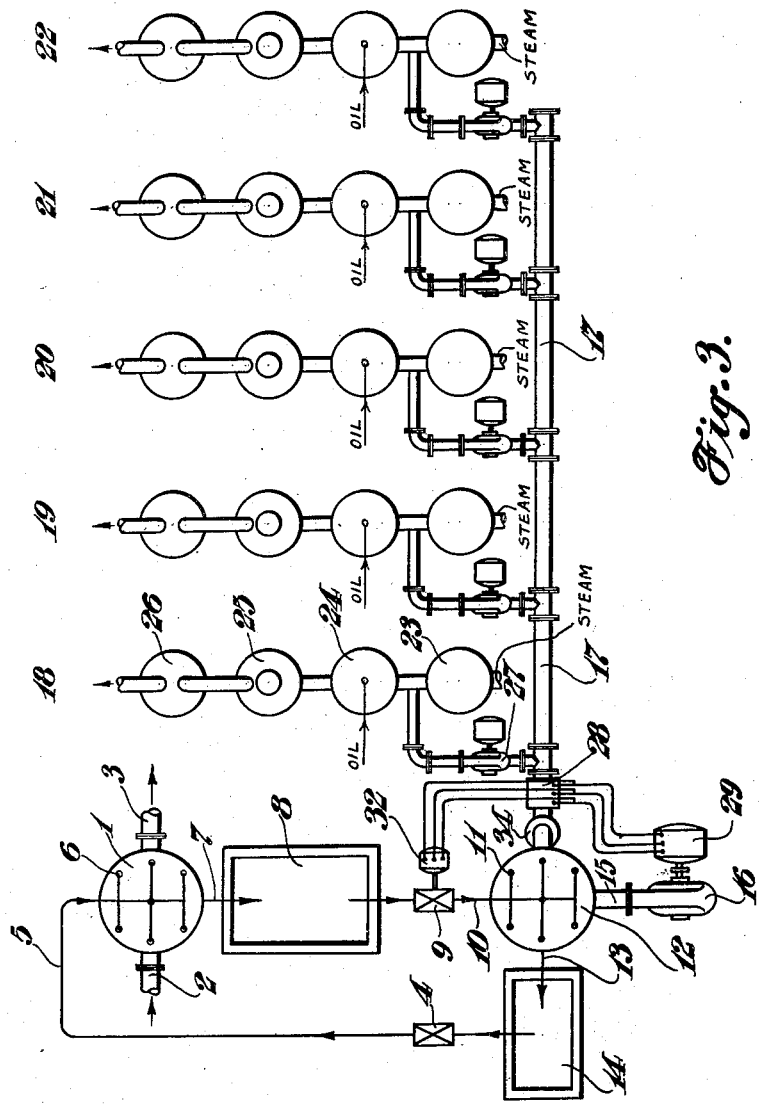

Patented Aug. 4, 1931

1,817,777

UNITED STATES PATENT OFFICE

FREDERICK W. SPERR, JR., OF PITTSBURGH, PENNSYLVANIA, ASSIGNOR TO THE KOPPERS COMPANY, A CORPORATION OF PENNSYLVANIA

GAS MANUFACTURING PROCESS AND APPARATUS

Application filed August 5, 1926. Serial No. 127,287.

My invention relates to the manufacture of fuel gas, for example, water gas and to purification of fuel gas from hydrogen sulphide, hydrogen cyanide and analogous impurities. The invention relates more particularly to the employment in the manufacture of carburetted water gas of fouled air resulting from processes for effecting such purification which involve treatment of the gas with an alkaline absorbent solution and subsequent regeneration or actification of the fouled solution by means of a current of air. Examples of such processes are described and claimed in U. S. Patents Nos. 1,389,980, of Charles J. Ramsburg and 1,390,037, of David L. Jacobson, both of Sept. 6, 1921.

In gas purification processes of the character recited above, the air used for actification of the fouled solution does not enter into the primary reactions of actification but serves as a carrier to remove hydrogen sulphide and other volatile impurities from the system. The disposal of impurity-laden actifier air has become a problem at plants situated in the vicinity of residential districts of towns and cities.

An object of the present invention is to dispose of actifier air of processes of the character indicated. I accomplish this object by passing the actifier air through a combustion zone or a stratum of incandescent material in gas-making apparatus whereby the impurities present in said air are oxidized to innocuous substances. This zone or stratum is maintained at a temperature high enough to cause the complete oxidation of $H_2S$ to $SO_2$ and of HCN to $H_2O$, $CO_2$ and $N_2$.

This is accomplished by utilizing actifier air as blast air in gas-making equipment—for example, carburetted water-gas sets. Such equipment is not infrequently present and available at plants where gas purification is practiced. In fact, the process may be employed for the purification of the gas manufactured in the same apparatus subsequently used to dispose of the actifier air.

An object of the invention is to provide means whereby the air requirements of actification and of gas making may be adjusted to each other, even when wide variations in the latter must be accounted for.

A further object of the invention is to provide an ample supply of actified absorbent solution to the purification absorber, even when, as in the case of a very small gas plant, the air requirements of the gas-making apparatus are not continuous but often are interrupted entirely during gas-making intervals.

A still further object of the present invention is to utilize as much as possible of the existing apparatus incident to the operation of a water-gas plant and to avoid the use of more than the minimum additional equipment.

As is well known, the usual water-gas plant consists of one or more sets operated independently of each other. When the number of sets is small, the irregularities in air requirements for the plant as a whole are high and intervals may occur when no air at all is being blown. As the number of sets increases, these irregularities tend to diminish. Accordingly, I provide means for operating gas purification plants in conjunction with water-gas plants of varying air requirements.

My invention has for further objects such other new and useful improvements in operating advantages and results as may hereinafter be found to obtain.

In order that my invention may be clearly set forth and understood, I now describe, with reference to the accompanying drawings which illustrate various embodiments of my invention, the preferred manner in which it is accomplished. In these drawings, Figure 1 is a diagrammatic plan view of apparatus for purifying gas operated in conjunction with a water-gas plant, and including means for disposing of the actifier air;

Fig. 2 is a diagrammatic plan view of gas purification apparatus operated in conjunction with a water-gas plant, and including means for accumulating actifier air prior to disposal thereof; and Fig. 3 is a diagrammatic plan view of gas purification apparatus operated in conjunction with a water-gas plant, and including means for accumulating fouled solution prior to actification thereof.

Similar characters of reference designate similar parts in each of the several views of the drawings.

Referring to Fig. 1, fuel gas that is to be purified enters an absorber 1 of the usual type through a conduit 2, passes upwardly through the absorber and escapes, in purified state, through a conduit 3. An alkaline solution—such, for example, as a 1 to 3% solution of sodium carbonate—is delivered by a pump 4 through a pipe line 5 and a spray system 6 to the absorber 1. This solution flows downwardly through the permeable contact material within the absorber 1 in counter-current with the flowing gas and absorbs impurities, i. e., $H_2S$ and $HCN$ therefrom. The fouled solution flows from the bottom of the absorber 1 through a pipe line 7 into a sump 8.

For actification, the fouled solution is delivered by a pump 9 through a line 10 and sprays 11 to the interior of an actifier 12. The actifier 12 is a gas and liquid contact apparatus similar to the absorber 1 and is preferably of somewhat larger dimensions. In the actifier 12, the fouled solution is subjected to a stream of air in counter-current. As recited above, this air removes the volatile impurities absorbed from the gas and causes a reversal of the reactions which occurred in the absorber 1 and a regeneration or actification of the solution, which then passes through a conduit 13 to a sump 14, where it is ready for further use.

Air is supplied to the actifier 12 through a conduit 15 from a fan 16 and, after entraining impurities mentioned, passes through a separator 34, whereby particles of liquid entrained in the gas are removed, into a manifold conduit 17 from which it is distributed, as desired, to the various units 18, 19, 20, 21, 22, etc., of a carburetted water-gas plant. The unit 18 is comprised of a water gas generator 23, a carburetter 24, a superheater 25, a wash box 26 and an individual blower 27 and the other units of the water-gas plant are similarly constituted.

In the normal operation of a water-gas plant of the character shown, it will be understood that the air requirements of the several units which comprise the plant vary considerably and, as it is ordinarily impractical to synchronize the several units, the total air requirements of the plant will also vary over a considerable range. However, in the case of a large plant, the irregularities of one unit are somewhat offset by those of the others and thus a fairly uniform air requirement may be maintained.

By way of specific illustration of the variation of air requirements of a plurality of water gas sets the following may be given. A typical carburetted water gas set, such as that shown in the accompanying drawings, may consist of five units. The air employed for blasting purposes in each of these units may amount to from 10,000 to 20,000 cubic feet of air during each minute of the blasting period and, due to the fact that each set is running independently and through a series of cycles consisting of alternate air blast and steam run periods, it will be obvious that the total air requirements of the entire plurality may vary from, say, 10,000 cubic feet of air per minute, or even no air at all, to a possible maximum of as much as 100,000 cubic feet of air per minute. Of course the air requirement is governed largely by the size of the sets, the nature of the fuel, the temperatures desired, and the like, and varies in each installation but in any case the employment of air is governed by the manufacture of water gas and sufficient air is employed during the blasting periods to support the subsequent manufacture of water gas and the carburetion thereof during the remaining portion of the cycle.

In order to insure satisfactory operation of the individual units, I have, as will be seen from the foregoing description and the drawings, provided each unit with an individual blower, and I have further provided the blower 16 for insuring a positive supply of air to the manifold conduit 17. The preferred procedure is to operate the various air supply means in such manner as to insure substantially atmospheric pressure within the manifold conduit 17 and to this end I provide a regulator 28 which may be of any suitable type for governing the speed of the motor 29, which drives the blower 16. The regulator 28 is responsive to the pressure within the conduit 17 and, when this pressure falls, causes the motor 29 to rotate at an increased speed, forcing the blower 16 to deliver more air to the actifier 12.

If now the air requirements of the water-gas plant decrease, the pressure within the conduit 17 will rise and the regulator 28 will be actuated in such manner as to decrease the amount of air delivered by the blower 16.

In the drawings, I have indicated the regulator 28 only diagrammatically. Devices of this character are known, and find use in various applications such as pressure regulation in by-product gas plants, boiler houses, and the like, and need not be more fully described here. These devices are obtainable for regulating either steam or electric motors, and consequently either steam or electricity may serve as the motive power.

It will be understood that, by maintaining atmospheric pressure within the conduit 17, I insure that the operation of the blowers 27, etc., of the water-gas plant will be practically the same as though they drew air directly from the atmosphere. This is a condition which is highly desired by the operators of the water-gas plant. Were the blowers of the water-gas plant supplied with air from a source of varying pressure, considerable difficulties would ensue.

In Fig. 2, I have shown means whereby a substantially constant supply of air to the blowers of the water-gas plant is insured without requiring apparatus for regulating the operation of the blower which supplies air to the actifier. In this modification of my invention, I provide a fan 30 which is operated at a constant speed, and I provide accumulating means, consisting of a gas holder 31, adapted to receive a varying volume of actifier air and which communicates with the actifier 12 and the conduit 17. In order to provide a supply of air to the water-gas plant which shall, at all times, be sufficient for the requirements thereof, even though the gas holder 31 becomes exhausted, I provide an automatic valve 33 which operates to admit air from the atmosphere into the conduit 17, whenever the gas holder 31 is empty. In this manner, I provide for uniform actification of the fouled gas purification solution, at the same time providing an ample supply of air at a uniform pressure to the water-gas plant. This particular embodiment of my invention is particularly adapted to the requirements of a small water-gas plant as continuous actification is accomplished even during periods in which no air at all is required for the operation of the water-gas plant.

In the system of Fig. 3, I provide means for regulating the operation of the blower 16 by means of a regulator 28, as shown in Fig. 1. However, in the present instance, the regulator 28 also serves to control the operation of a motor 32 that drives the pump 9, in such manner as to cause the operation of the pump 9 and the blower 16 to be proportional to each other. An alternate method of accomplishing the object is to provide a pulley by which the pump 9 may be driven from the regulated motor 32 that drives the blower 16. In this manner, the volume of air supplied to the actifier 12 is always directly proportional to the amount of fouled solution which is to be regenerated. In ordinary practice, it has been found desirable to pass 1000 cubic feet of air through the actifier for every 15 to 20 gallons of fouled solution; it is desirable to maintain this ratio in spite of fluctuations in the air blown into the water-gas plant.

In the present instance, I prefer that the sump 8 shall be of relatively large dimensions so that an accumulation of fouled solution may be possible during those periods when comparatively small amounts of solution and air are being supplied to the actifier 12.

In general the entire system is so designed that the average air requirement of the water-gas plant is in excess of the air requirements of actification and this relation insures that actification will be complete at all times.

It will thus be apparent that, as shown in Fig. 1, the rate of flow of air and, as shown in Fig. 3, the rates of flow of both the air and the solution passing through the actifier 12 are co-ordinated with the amount of air required by the carburetted water gas sets 18 to 22 inclusive to heat the fuel beds and carburetters thereof to such extent as to support the subsequent generation of water gas and carburetion thereof, respectively, in the usual manner. It will further be obvious that, if desired, thermostats can be placed in the generator fuel beds or the carburetters or both to control regulators which co-ordinate the flow of air in accordance with the proper operating temperatures, this being well within the skill of the art.

My invention provides a suitable and convenient method and apparatus for disposing of actifier air of the gas purification process of the character indicated that is adapted to the requirements of the gas purification system itself and also to the gas manufacturing plant to which the actifier air is supplied. A particular advantage of my invention resides in the fact that the individual operation and control of the gas manufacturing unit is not hampered or interfered with in any way.

While I have described my invention with relation to a particular process of gas purification, it may also be applied to other processes of gas purification in which the impurities originally present in the gas are transferred to a current of air,—for example, processes involving the utilization of other alkaline or absorbent liquids.

While I have described my invention with reference to particular embodiments and methods of operation, it is limited to such illustrative examples but may be variously embodied within the scope of the claims hereinafter made.

I claim as my invention:

1. The process of making carburetted water gas in a set including a water-gas generator adapted to contain a bed of solid incandescent fuel and a carburetter, which comprises passing air through a fouled alkaline absorbent solution containing hydrogen sulphide whereby the solution is actified and hydrogen sulphide is absorbed by said air, then heating the generator fuel bed and also the carburetter surfaces by passing the fouled air therethrough and burning it, then passing steam through the heated fuel bed and thereby generating water gas, carburetting the water gas by introducing oil thereto while the water gas is passing through said carburetter, and co-ordinating passing of the air through the fouled solution with the amount of said air required for heating said fuel bed and said carburetter surfaces sufficiently to support the subsequent generation of water gas and the carburetion thereof, respectively.

2. The process of making carburetted water gas in a set including a water-gas generator adapted to contain a bed of solid incandescent fuel and a carburetter, which comprises passing air through a fouled alkaline absorbent solution containing hydrogen sulphide whereby the solution is actified and hydrogen sulphide is absorbed by said air, then heating the generator fuel bed and also the carburetter surfaces by passing the fouled air therethrough and burning it, then passing steam through the heated fuel bed and thereby generating water gas, carburetting the water gas by introducing oil thereto while the water gas is passing through said carburetter, and co-ordinating passing of the air and solution through said actification stage with the amount of said air required for heating said fuel bed and said carburetter surfaces sufficiently to support the subsequent generation of water gas and the carburetion thereof, respectively, the rates of flow of said air and said solution through said actification stage being maintained at a substantially constant ratio with respect to each other.

3. Apparatus for making carburetted water-gas comprising in combination, a water-gas generator adapted to contain a bed of solid incandescent fuel, a carburetter, an actifier, means for passing air through a fouled alkaline absorbent solution containing hydrogen sulphide in said actifier, means for delivering thereby fouled air from said actifier to the generator and carburetter to heat the same, means for introducing steam to said generator and oil to said carburetter, and means for co-ordinating passing of said air through said actifier with the amount of air required for heating the generator fuel bed and carburetter surfaces sufficiently to support the subsequent generation of water gas and the carburetion thereof, respectively.

4. Apparatus for making carburetted water-gas comprising in combination, a water-gas generator adapted to contain a bed of solid incandescent fuel, a carburetter, an actifier, means for passing air through a fouled alkaline absorbent solution containing hydrogen sulphide in said actifier, means for delivering thereby fouled air from said actifier to the generator and carburetter to heat the same, means for introducing steam to said generator and oil to said carburetter, and means for co-ordinating passing of said air and said solution.

In testimony whereof, I have hereunto subscribed my name this 4th day of August, 1926.

FREDERICK W. SPERR, Jr.